United States Patent
Hashemi et al.

(10) Patent No.: US 12,271,363 B2
(45) Date of Patent: Apr. 8, 2025

(54) OPTIMAL DYNAMIC SHARD CREATION IN STORAGE FOR GRAPH WORKLOADS

(71) Applicant: Samsung Electronics Co., Ltd., Suwon-si (KR)

(72) Inventors: Seyedeh Hanieh Hashemi, Los Angeles, CA (US); Joo Hwan Lee, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 362 days.

(21) Appl. No.: 16/274,232

(22) Filed: Feb. 12, 2019

(65) Prior Publication Data
US 2020/0192880 A1    Jun. 18, 2020

Related U.S. Application Data

(60) Provisional application No. 62/780,186, filed on Dec. 14, 2018.

(51) Int. Cl.
*G06F 16/22*    (2019.01)
*G06F 16/23*    (2019.01)
(Continued)

(52) U.S. Cl.
CPC .......... *G06F 16/2272* (2019.01); *G06F 16/23* (2019.01); *G06F 16/2456* (2019.01); *G06F 16/287* (2019.01); *G06F 16/9024* (2019.01)

(58) Field of Classification Search
CPC ............. G06F 16/2282; G06F 16/2272; G06F 16/9024; G06F 16/2456; G06F 16/23; G06F 16/287
See application file for complete search history.

(56) References Cited

U.S. PATENT DOCUMENTS 9,047,351 B2    6/2015    Riddle et al.
9,477,779 B2    10/2016    Webber et al.
(Continued)

FOREIGN PATENT DOCUMENTS

CN    104881466 A    9/2015
CN    108132838 A    6/2018
(Continued)

OTHER PUBLICATIONS

Harshvardhan et al., "A Hybrid Approach to Processing Big Data Graphs on Memory-Restricted Systems", 2015 IEEE 29th International Parallel and Distributed Processing Symposium, IEEE Computer Society, pp. 799-808, 10 pages.
(Continued)

*Primary Examiner* — Pierre M Vital
*Assistant Examiner* — Andrew N Ho
(74) *Attorney, Agent, or Firm* — Renaissance IP Law Group LLP

(57) ABSTRACT

According to one general aspect, an apparatus may include a host processor interface circuit configured to communicate data and commands with an external host processor circuit. The apparatus may include a controller processor circuit configured to merge graph data elements into merged dynamic shards, wherein the merged dynamic shards include the same number of graph data elements. The apparatus may include a non-volatile memory configured to store data in an at least a partial graph structure, wherein the graph structure includes data elements that each include vertexes and an edge, and wherein sub-portions of the data elements are grouped into shards.

19 Claims, 12 Drawing Sheets

(51) Int. Cl.
    *G06F 16/2455*    (2019.01)
    *G06F 16/28*    (2019.01)
    *G06F 16/901*    (2019.01)

(56) References Cited

U.S. PATENT DOCUMENTS

| | | | |
|---|---|---|---|
| 9,535,963 | B1 | 1/2017 | Shankar et al. |
| 9,740,762 | B2 | 8/2017 | Horowitz et al. |
| 10,268,725 | B2 | 4/2019 | Venkataramani et al. |
| 11,256,749 | B2 | 2/2022 | Xia et al. |
| 2011/0010396 | A1* | 1/2011 | Zhou .................. G06F 16/9024 707/798 |
| 2012/0016901 | A1 | 1/2012 | Agarwal et al. |
| 2012/0218268 | A1* | 8/2012 | Accola .................. G06F 9/5016 345/440 |
| 2012/0254175 | A1* | 10/2012 | Horowitz .............. G06F 16/278 707/737 |
| 2012/0310916 | A1* | 12/2012 | Abadi ............... G06F 16/24542 707/713 |
| 2012/0310959 | A1* | 12/2012 | Huhn .................. G06F 16/2282 707/756 |
| 2014/0032579 | A1* | 1/2014 | Merriman ............... G06F 16/23 707/756 |
| 2014/0244687 | A1* | 8/2014 | Shmueli ................. G06F 16/28 707/780 |
| 2014/0279961 | A1* | 9/2014 | Schreter ................ G06F 3/0673 707/693 |
| 2014/0337280 | A1* | 11/2014 | Bergstrom .......... G06F 16/9024 707/608 |
| 2015/0134637 | A1 | 5/2015 | Pall et al. |
| 2015/0186427 | A1* | 7/2015 | Logothetis .......... G06F 16/9024 707/776 |
| 2016/0019745 | A1 | 1/2016 | Graham et al. |
| 2016/0063132 | A1* | 3/2016 | Chen .................. G06F 16/9024 707/609 |
| 2016/0071233 | A1* | 3/2016 | Macko ................. G06T 11/206 345/440 |
| 2016/0110404 | A1* | 4/2016 | Rao .................... G06F 16/9024 707/690 |
| 2016/0110474 | A1* | 4/2016 | Um ..................... G06F 16/9024 707/722 |
| 2016/0203168 | A1 | 7/2016 | Gangadharappa et al. |
| 2016/0350662 | A1 | 12/2016 | Jin et al. |
| 2016/0357516 | A1 | 12/2016 | Kogel et al. |
| 2017/0091334 | A1* | 3/2017 | Kabiljo ............. G06F 16/24578 |
| 2017/0147706 | A1* | 5/2017 | Roth .................... G06F 16/278 |
| 2017/0255708 | A1* | 9/2017 | Cho ........................ G06F 16/22 |
| 2017/0255709 | A1* | 9/2017 | Cho ........................ G06F 16/28 |
| 2017/0316591 | A1* | 11/2017 | Viswanathan ............ G06T 1/60 |
| 2017/0364534 | A1* | 12/2017 | Zhang .................. G06F 16/284 |
| 2018/0089324 | A1* | 3/2018 | Pal .......................... G06F 9/546 |
| 2018/0285477 | A1* | 10/2018 | Bik ..................... G06F 11/1451 |
| 2018/0329958 | A1* | 11/2018 | Choudhury ......... G06F 16/2456 |
| 2018/0341930 | A1* | 11/2018 | Moir ................. G06Q 20/0655 |

FOREIGN PATENT DOCUMENTS

| | | |
|---|---|---|
| JP | 2008090518 A | 4/2008 |
| JP | 2017073162 A | 4/2017 |

OTHER PUBLICATIONS

Kyrola, Aapo, et al., "GraphChi: Large-Scale Graph Computation on Just a PC", USENIX Association, 10th USENIX Symposium on Operating Systems Design and Implementation (OSDI '12), pp. 31-46, 16 pages.

Malewicz, Grzegorz, et al., "Pregel: A System for Large-Scale Graph Processing", SIGMOD '10, Jun. 6-11, 2010, pp. 135-145, 11 pages.

Rodriguez, Marko A., "On Graph Computing", Jan. 9, 2013.

Sun, Peng et al., "GraphMP: an Efficient Semi-External-Memory Big Graph Processing System on a Single Machine", Jul. 9, 2017, School of Computer Science and Engineering, 10 pages.

Vora, Keval, "Load the Edges You Need: a Generic I/O Optimization for Disk-based Graph Processing", USENIX Association, 2016 USENIX Annual Technical Conference, pp. 507-522, 17 pages.

\* cited by examiner

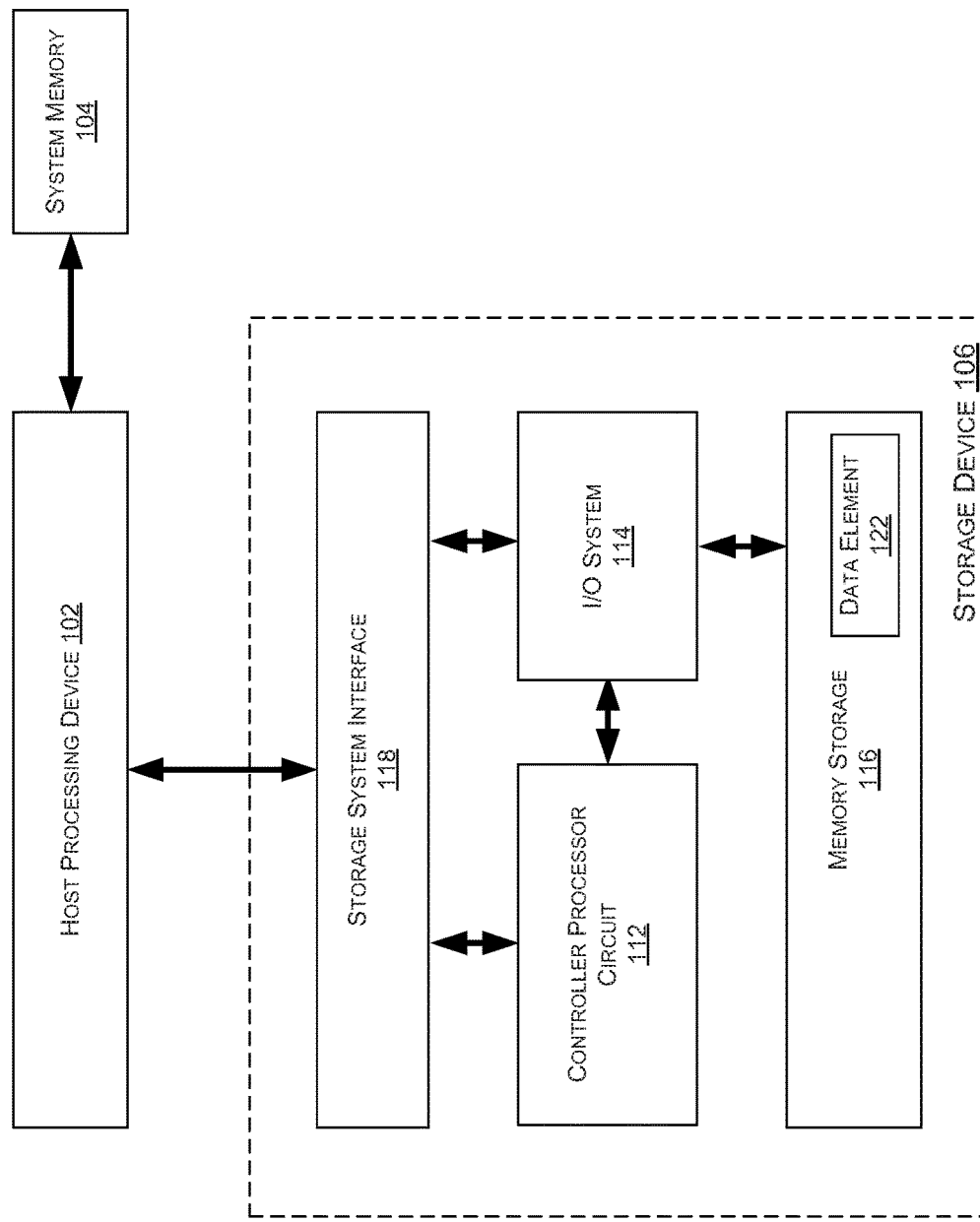

| | Source Vertex 252 | Dest /Target Vertex 254 | Edge Value 256 |
|---|---|---|---|
| 204 | | | |

| | Source Vertex 252 | Dest /Target Vertex 254 | Edge Value 256 |
|---|---|---|---|
| 270 | A | B | 0x0BAD |
| 272 | A | C | 0xF00D |
| 274 | B | D | 0xF1CE |
| 276 | D | A | 0xCAFE |
| 278 | D | E | 0xDEAD |
| 280 | E | D | 0xBEEF |

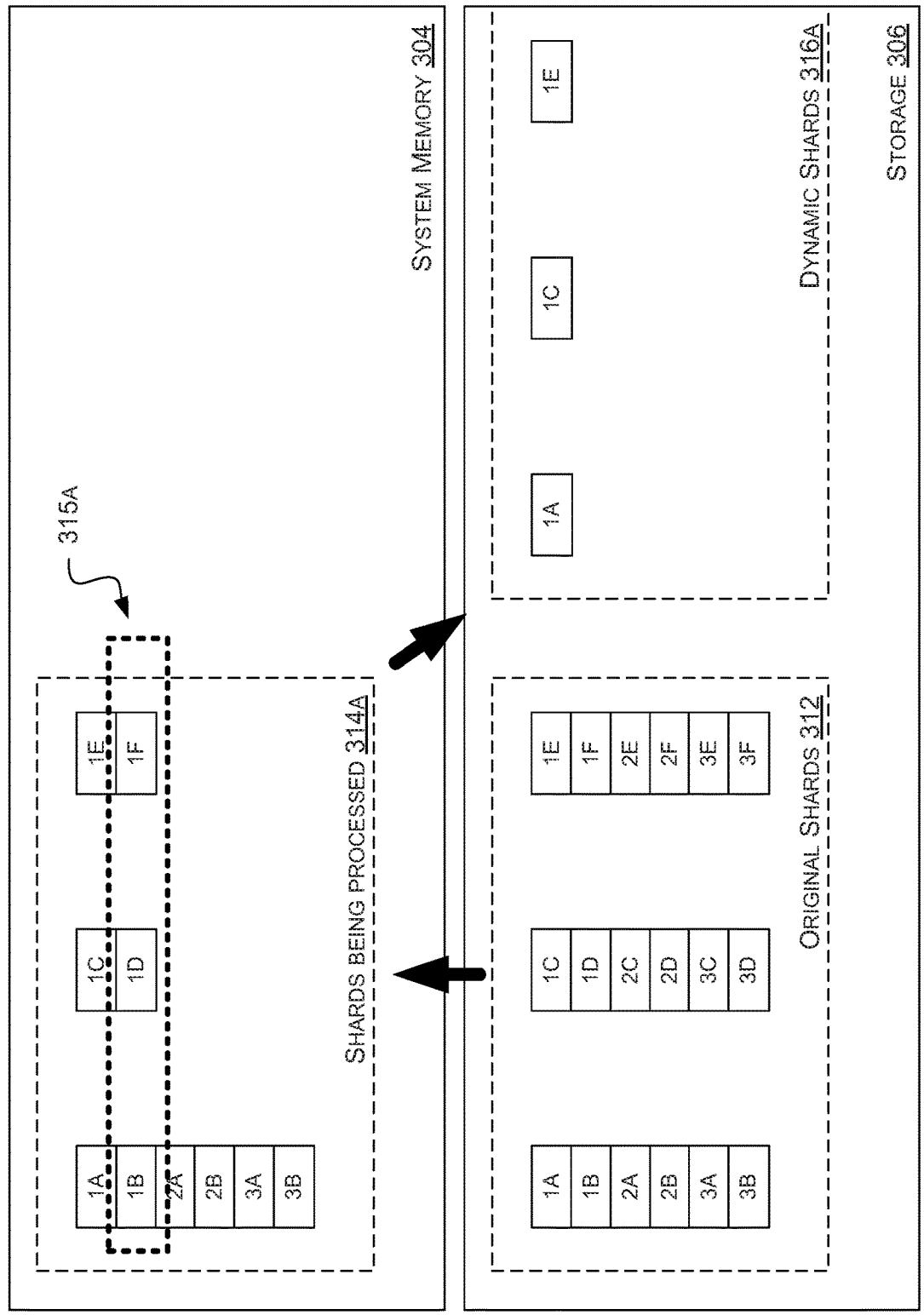

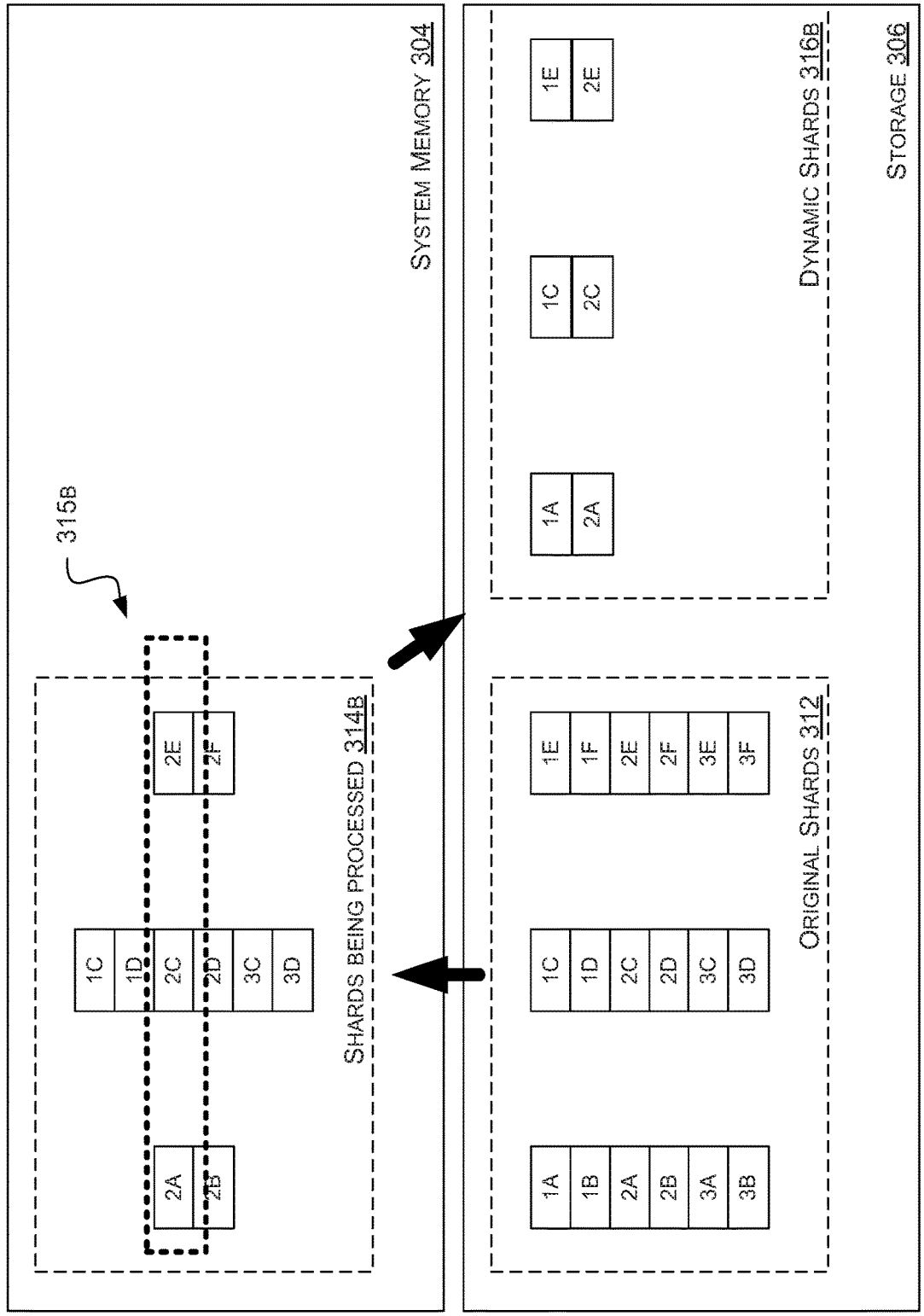

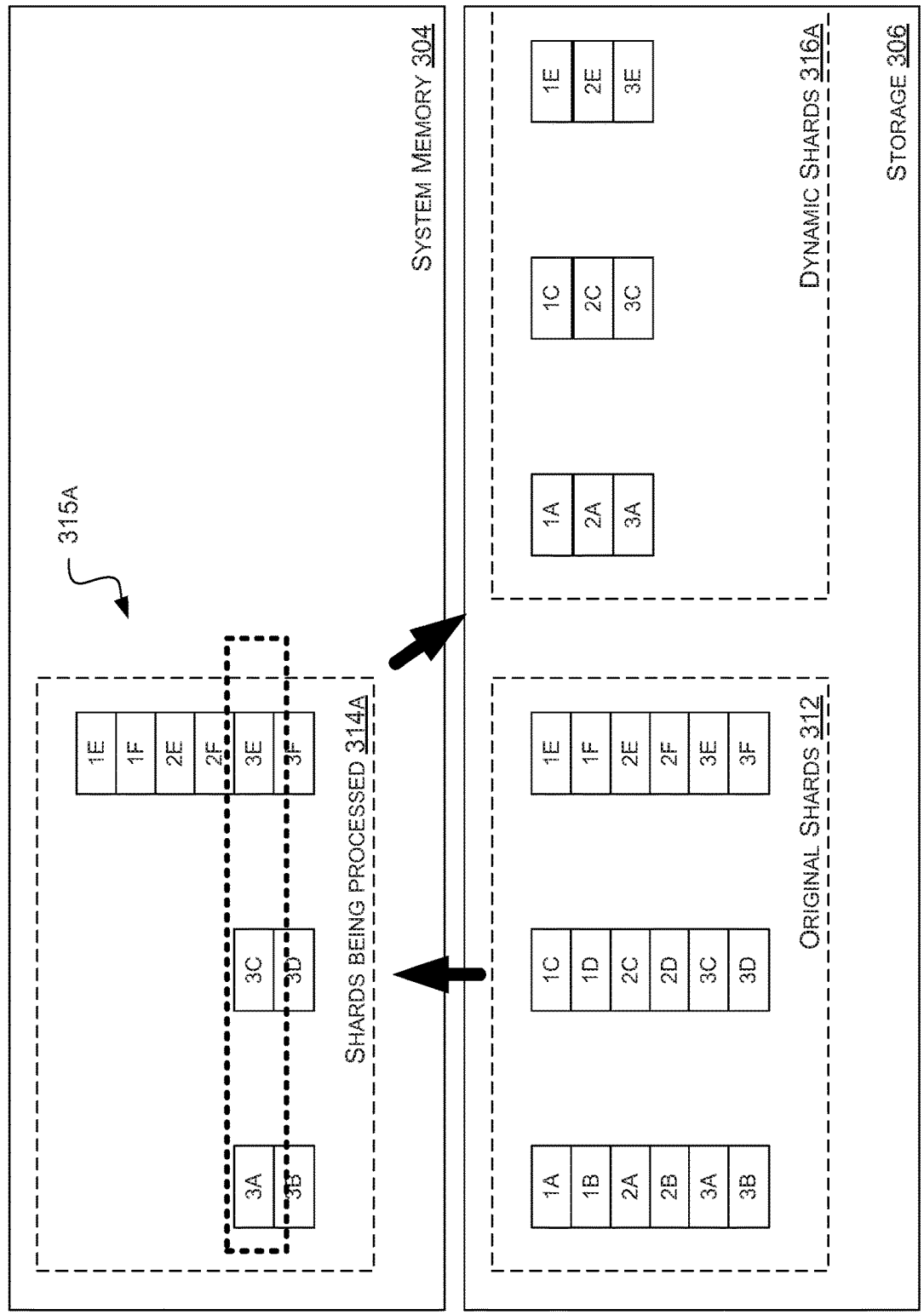

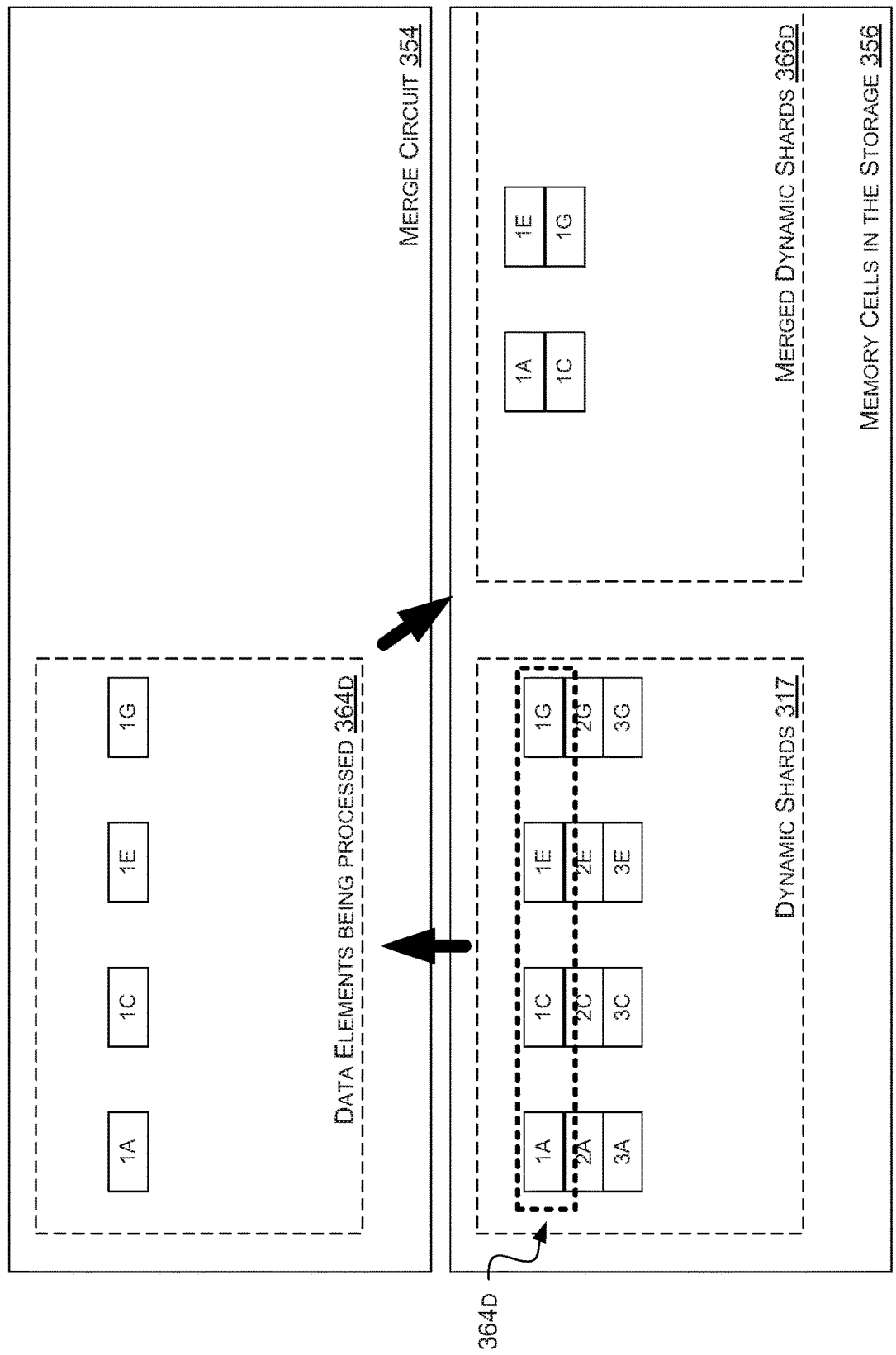

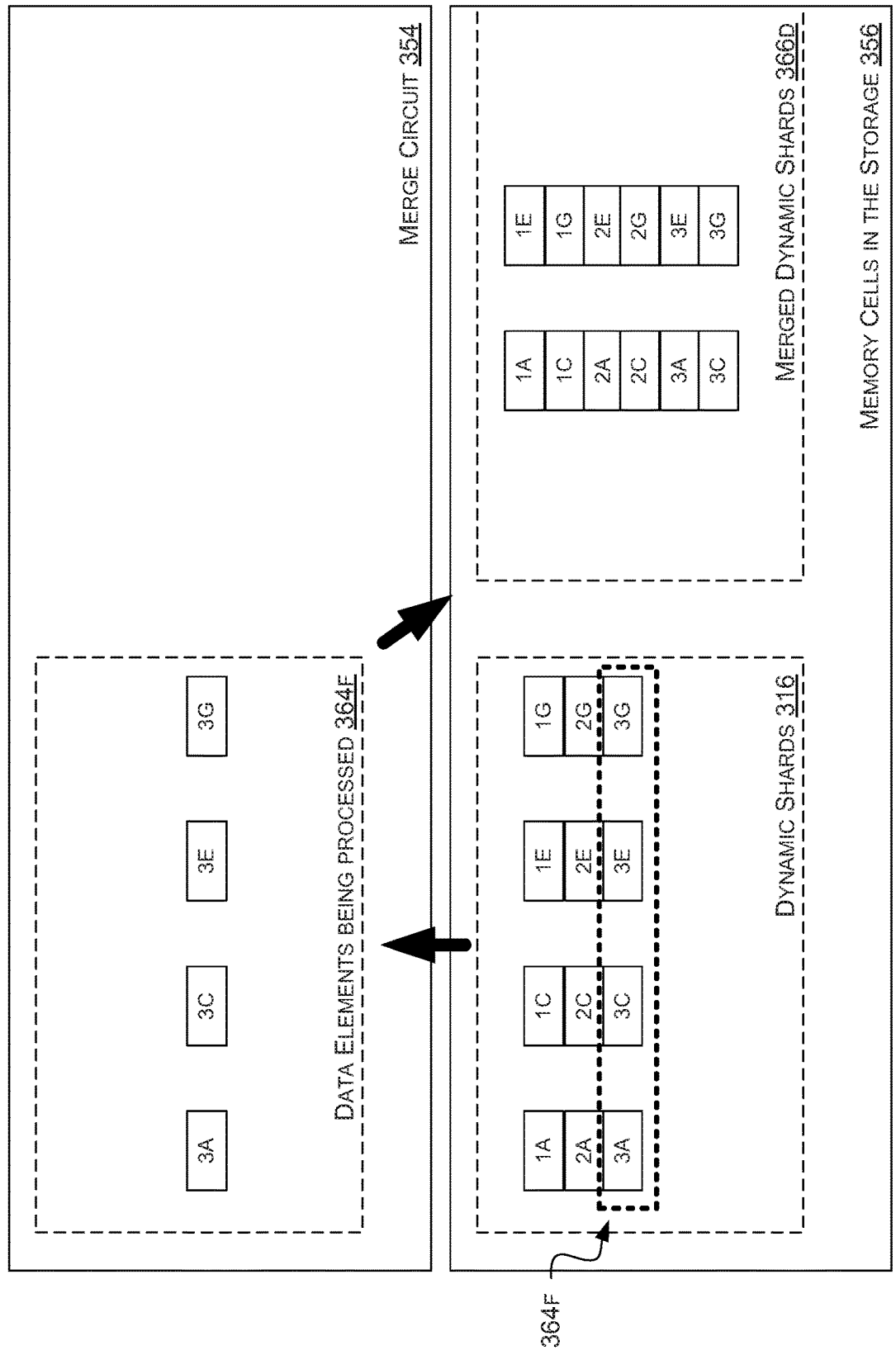

OPTIMAL DYNAMIC SHARD CREATION IN STORAGE FOR GRAPH WORKLOADS

CROSS-REFERENCE TO RELATED APPLICATION

This application claims priority under 35 U.S.C. § 119 to Provisional Patent Application Ser. No. 62/780,186, entitled "OPTIMAL DYNAMIC SHARD CREATION IN STORAGE FOR GRAPH WORKLOADS" filed on Dec. 14, 2018. The subject matter of this earlier filed application is hereby incorporated by reference.

TECHNICAL FIELD

This description relates to the storing and processing of data, and more specifically to optimal dynamic shard creation in storage for graph workloads.

BACKGROUND

In computer science, graph theory is the study of graphs, which are data structures used to model pairwise relations between objects. A graph in this context is made up of vertices, nodes, or points which are connected by edges, arcs, or lines. In computing, a graph database (GDB) is a database that uses graph structures for semantic queries with nodes, edges and properties to represent and store data. A key concept of the system is the graph (or edge or relationship), which directly relates data items in the store a collection of nodes of data and edges representing the relationships between the nodes. The relationships allow data in the store to be linked together directly, and in many cases retrieved with one operation. Graph databases hold the relationships between data as a priority. Querying relationships within a graph database is fast because they are perpetually stored within the database itself. Relationships can be intuitively visualized using graph databases, making it useful for heavily inter-connected data.

Graph computing has become popular recently as Big Data applications have become more practical. As a few examples, graphs are used in computer science to represent the flow of computation. In operating systems resource allocation graph are used for process and deadlock detection and correction. Graphs are used in the study of molecules, for studying the construction of bonds in chemistry and the study of atoms. used Graphs are employed in biology and conservation efforts where a vertex represents regions where certain species exist and the edges represent migration path or movement between the regions. Google maps, and in global positioning system (GPS) applications in general, uses graphs for building transportation systems, where intersection of two (or more) roads are considered to be a vertex and the road connecting two vertices is considered to be an edge, thus their navigation system employs the graph to calculate the shortest path between two vertices. Likewise, graphs are used in search and recommendation engines to identify page relevance, and interconnections. In Facebook and social media, users are considered to be the vertices and if they are friends then there is an edge running between them. Facebook's Friend suggestion technique uses graph theory.

A significant performance bottleneck of graph applications is the enormous graph size and the random input/output (IO or I/O) access pattern. Standard sparse graph formats such as compressed sparse row (CSR) and compressed sparse column (CSC) involves random access of edge values. Since big graphs with millions of vertices and billion edges do not fit on dynamic random access memory (DRAM), standard sparse graph formats thus lead to random disk access to store graph data on disk and load from disk. IO intensive graph workloads with small amount of computation suffer from high IO latency due to their random IO access pattern, since even fast non-volatile memory express (NVME) devices have considerably lower random read and write speed in comparison to their sequential access speed.

SUMMARY

According to one general aspect, an apparatus may include a host processor interface circuit configured to communicate data and commands with an external host processor circuit. The apparatus may include a controller processor circuit configured to merge graph data elements into merged dynamic shards, wherein each merged dynamic shard includes the same number of graph data elements. The apparatus may include a non-volatile memory configured to store data in an at least a partial graph structure, wherein the graph structure includes data elements that each include vertexes and an edge, and wherein sub-portions of the data elements are grouped into shards.

According to another general aspect, a system may include a host processor circuit configured to execute instructions related to a graph data structure. The system may include at least one storage device. Each storage device may include a host processor interface circuit configured to communicate data with the host processor circuit. The storage device(s) may include a controller processor circuit configured to merge graph data elements into merged dynamic shards, wherein each merged dynamic shard includes the same number of graph data elements. The storage device(s) may include a non-volatile memory configured to store data in an at least partial graph structure, wherein the graph structure includes data elements that each include vertexes and an edge, and wherein sub-portions of the data elements are grouped into shards.

The details of one or more implementations are set forth in the accompanying drawings and the description below. Other features will be apparent from the description and drawings, and from the claims.

A system and/or method for storing and processing of data, and more specifically to optimal dynamic shard creation in storage for graph workloads, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIGS. 3A, 3B, and 3C are diagrams of an example embodiment of data structures in accordance with the disclosed subject matter.

FIGS. 3D, 3E, and 3F are diagrams of an example embodiment of data structures in accordance with the disclosed subject matter.

Like reference symbols in the various drawings indicate like elements.

DETAILED DESCRIPTION

Figure 2A:
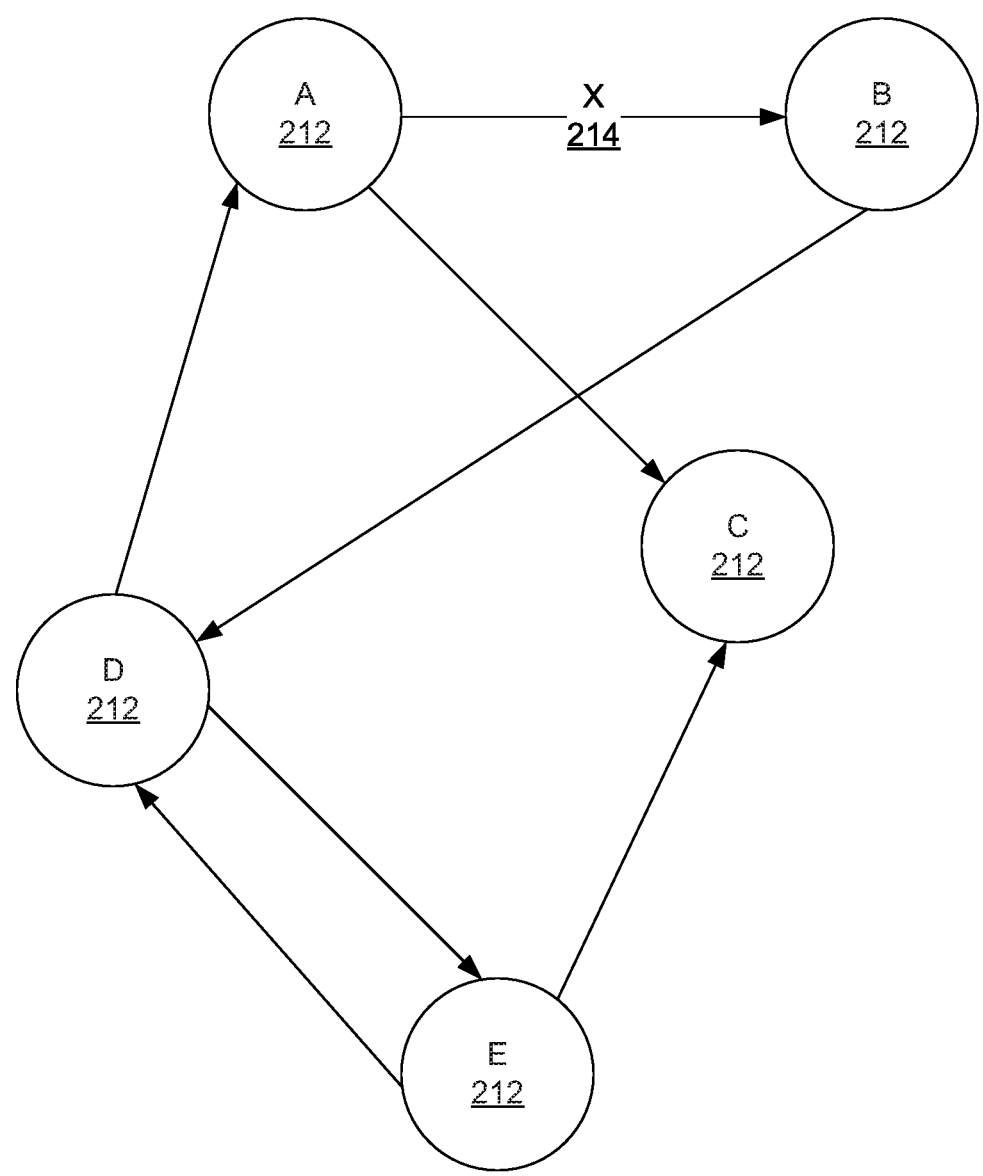
FIGS. 2A and 2B are diagrams of an example embodiment of data structures in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a computing device, such as, for example, a laptop, desktop, workstation, personal digital assistant, smartphone, tablet, system on a chip (SoC), and other appropriate computers or a virtual machine or virtual computing device thereof. It is understood that the above are merely a few illustrative examples to which the disclosed subject matter is not limited.

As described above, graph computing typically involves the storage of large amounts of data on a large storage system. often a distributed storage system. Likewise, the processing of graph data structures was typically performed on multiple computing devices in parallel. The trend is for the processing to be moved off the multiple devices and onto a single computing device. Although, the disclosed subject matter could be applied to embodiments that include multiple systems or are distributed.

As described above, a significant performance bottleneck of graph applications is the enormous graph size and the random input/output (IO or I/O) access pattern. Standard sparse graph formats such as compressed sparse row (CSR) and compressed sparse column (CSC) involves random access of edge values. Since big graphs with millions of vertices and billion edges do not fit on dynamic random access memory (DRAM), standard sparse graph formats thus lead to random disk access to store graph data on disk and load from disk. IO intensive graph workloads with small amount of computation suffer from high IO latency due to their random IO access pattern, since even fast non-volatile memory express (NVME) devices have considerably lower random read and write speed in comparison to their sequential access speed.

In the illustrated embodiment, the system 100 may be employed to attempt to decrease the amount of IO access needed to process the graph structure. The system 100 shows one embodiment in which part of the processing of the graph structure is performed on the storage device 106. In another embodiment, the same processing or part of it may still be performed by the host processing device 102. It is understood that the above is merely one illustrative example to which the disclosed subject matter is not limited.

In the illustrated embodiment, the system 100 may include a host processing device or circuit 102. In such an embodiment, the host processor 102 may be configured to execute one or more machine executable instructions or pieces of software, firmware, or a combination thereof. In various embodiments, the host processor 102 may include a central processing unit (CPU) or other general purpose processor. In another embodiment, the host processor 102 may include a specialized processor (e.g., a graphical processing unit (GPU) or other parallel computation-oriented processor). In such an embodiment, the host processor 102 may perform a majority of the overall processing of the graph structure. It is understood that the above are merely a few illustrative examples to which the disclosed subject matter is not limited.

In the illustrated embodiment, the system 100 may include a system memory 104. In various embodiments, the system memory 104 may include volatile memory (e.g., DRAM), non-volatile memory or a combination thereof. In various embodiments, the memory 104 may be configured to store data in a temporary, or semi-permanent form.

In the illustrated embodiment, the system 100 may include a storage device 106. In various embodiments, storage device 106 may be configured to store data in a semi-permanent or substantially permanent form. In the illustrated embodiment, the storage device 106 may include non-volatile memory (e.g., Flash memory, magnetic memory). Further, in the illustrated embodiment, the storage device 106 may be configured to process, at least partially, the graph data structure. In various embodiments, the system 100 may include a plurality of storage devices 106.

In such an embodiment, the storage device 106 may include a storage system interface or circuit 118 configured to communicate (e.g., both data and commands) with the host processing device 102 or a memory management system (not shown) that, in turn, communicates with the host processor 102.

In such an embodiment, the storage device 106 may include a memory storage 116 or a plurality of memory cells, circuits, or elements that store data. In the illustrated embodiment, the memory storage 116 may be configured to store a plurality of data elements 122 that make up the graph data structure, or a part of graph data structure.

In various embodiments, the storage device 106 may include an input/output (IO or I/O) system or circuit 114 configured to communicate between the memory storage 116 and the storage system interface 118. In various embodiments, the IO system 114 may include a flash translation layer (FTL) circuit or other structure. In such an embodiment, the IO system 114 may include various caches, tables, or data structures and the circuitry to implement them.

In the illustrated embodiment, the storage device 106 may include a controller processor circuit 112. In various embodiments, the controller processor 112 may be configured to perform various data management activities within the storage device 104. In such an embodiment, this may include wear-leveling, write merging, etc. In the illustrated embodiment, the controller processor 112 may also be configured to process, at least partially, the data elements 122 of the graph data. In some embodiments, the host processor 102 may be able to offload some processing tasks to the controller processor 112. Specifically, in such an embodiment, the controller processor 112 may be configured to merge graph data elements into merged dynamic shards, predict active edges/vertexes, and/or reassign vertex identifiers (IDs). It is understood that the above are merely a few illustrative examples to which the disclosed subject matter is not limited.

Figure 2B:

FIGS. 2A and 2B are diagrams of an example embodiment of data structures 200, 204 and 206 in accordance with the disclosed subject matter. In various embodiments, these data structures 200, 204, and 206 may be stored, at least partially, in the storage device or memory cells.

Data structure 200 shows an example graph data structure. As described above, the graph data structure may include a plurality of vertexes 212 (e.g., vertexes A, B, C, D, and E). These vertexes 212 may represent various real world or conceptual things (e.g., people, cross-roads, web pages, goods to be sold, etc.). These vertexes 212 may be connected via edges 214. In general, each edge 214 includes a strength or value associated with it that indicates some property of the association between the vertexes 212. Further, each edge 214 may include a direction. Some graphs may be unidirectional or bidirectional. For example, edge X 214 may connect source vertex A 212 with destination or target vertex B 212. In various embodiments, a myriad of other properties may be associated with the vertexes 212 and edges 214.

Data structure 204 shows that in one embodiment, each edge 214 may be stored as a data element 204. In such an embodiment, the data element 204 may include a triplet of data that includes a source vertex identifier (ID) 252, a target vertex ID 254, and an edge value 256. In various embodiments, these sub-elements 252, 254, and 256 may include their own data structures (e.g., arrays, associate arrays, key-value pairs) or pointers to a data structure. In various embodiments, the data element 204 may include additional properties or values. It is understood that the above is merely one illustrative example to which the disclosed subject matter is not limited.

Data structure 206 illustrates who, in one embodiment, the data structure 200 may actually be stored in the storage device. In such an embodiment, the data structure 206 may include a data element 270, 272, 274, 276, 278, and 280 (collectively data elements 204) for each edge 214 of the graph 200. In various embodiments, the data elements 204 may be sorted or organized by the source vertex ID 252.

FIGS. 3A, 3B, and 3C are diagrams of an example embodiment of a system 300 and data structures 312, 314, and 316 in accordance with the disclosed subject matter. In the illustrated embodiment, the system 300 may also include a host processor (shown in FIG. 1).

In the illustrated embodiment, the graph data structure may be pruned or reduced to manageable portions, referred to as "shards". Often graph structures include billions of edges. This means that they must be processed on large parallel computing clusters. To address this problem, Parallel Sliding Windows (PSW) have been used for processing very large graphs from disk. As the larger graph is portioned into smaller sub-portions, each sub-portion may be handled separately by a single computing device (e.g., the host processor) and without the need of a giant cluster or distributed computing system.

As described above, the graph may be grouped into shards 312, which include commonalities, such as, all edges having the same destination or source vertex. In such an embodiment, the size of the shard may be chosen in order to balance the size of the computing task with the efficiency of more data.

Further, graph structures are generally processed in a loop or over a number of iterations. The computing system will process or analyze the whole graph, before starting the entire process over again. As described above, between each iteration the values or connections between the edges/vertexes may change. Values that change in some way are deemed to be "active", whereas unchanging edges/vertexes are often deemed to be "inactive".

In the illustrated embodiment, the storage device or memory cells 306 stores the original shards 312. In the illustrated embodiment, three shards 312 are shown. The first shard including data elements 1A, 1B, 2A, 2B, 3A, and 3B. The second shard including data elements 1C, 1D, 2C, 2D, 3C, and 3D. The third shard including data elements 1E, 1F, 2E, 2F, 3E, and 3F.

In the illustrated embodiment, the processing device (e.g., the host processor) may load or read the desired data elements from the shards 312 into the system memory 304 (e.g., DRAM). In the illustrated embodiment of FIG. 3A, the desired data elements may include entirety of the first shard (1A, 1B, 2A, 2B, 3A, and 3B), elements 1C and 1D of the second shard, and elements 1E and 1F of the third shard. These data elements may include the in-process shards 314A.

During this processing, the processing device may detect that a portion of the shards 314A have changed or are active. This is represented by the box 315A, which indicates that elements 1B, 1D, and 1F have changed since the last iteration and are active.

In such an embodiment, the processing device may write the active elements 315A back to the storage 306. These active elements 315A may be included in a set of dynamic shards 316A, which are redacted or minimized versions of the shards 312. In such an embodiment, these dynamic shards 316 may include only the active elements, the elements with active edges, or in some embodiments, the elements with active vertexes.

Continuing on, FIG. 3B shows the next processing step. In a second processing step or stage, the processing device (e.g., the host processor) may load or read the desired data elements from the shards 312 into the system memory 304. In the illustrated embodiment of FIG. 3B, the desired data elements may include elements 2A and 2B of the first shard, all elements of the second shard, and elements 2E, and 2F of the third shard. These data elements may include the in-process shards 314B.

During this processing, the processing device may detect that a portion of the shards 314B have changed or are active (elements 1C and 1E already being detected as active). This is represented by the box 315B, which indicates that elements 2A, 2C, and 2E have changed since the last iteration and are active. In such an embodiment, the processing device may write the active elements 315B back to the storage 306. These active elements 315B may be included in or appended/added to a set of dynamic shards 316B.

FIG. 3C shows the next processing step. In a third processing step or stage, the processing device (e.g., the host processor) may load or read the desired data elements from the shards 312 into the system memory 304. In the illustrated embodiment of FIG. 3C, the desired data elements may include elements 3A and 3B of the first shard, elements 3C and 3D of the second shard, and all elements of the third shard. These data elements may include the in-process shards 314C.

During this processing, the processing device may detect that a portion of the shards 314C have changed or are active. This is represented by the box 315C, which indicates that elements 3A, 3C, and 3E have changed since the last iteration and are active. In such an embodiment, the processing device may write the active elements 315C back to the storage 306. These active elements 315C may be included in or appended/added to a set of dynamic shards 316C.

In the illustrated embodiment, three dynamic shards 316 are created. The first including the elements 1A, 2A, and 3A. The second including the elements 1C, 2C, and 3C. And, the third including the elements 1E, 2E, and 3E. It is understood that the above is merely one illustrative example to which the disclosed subject matter is not limited. In such an embodiment, the dynamic shards 316 may change after each iteration of graph processing as the active elements may change.

In such an embodiment, the use of dynamic shards 316 may reduce the IO inefficiency of future processing (in future iterations) as less data needs to be transferred between the memory 304 and the storage 306. However, small shard size reduces the amount of parallelism for graph processing and increases the number of disk accesses. The number of disk accesses of graph workloads remain same, while the amount of data is reduced, thus leading to inefficient utilization of available memory budget.

Figure 3E:
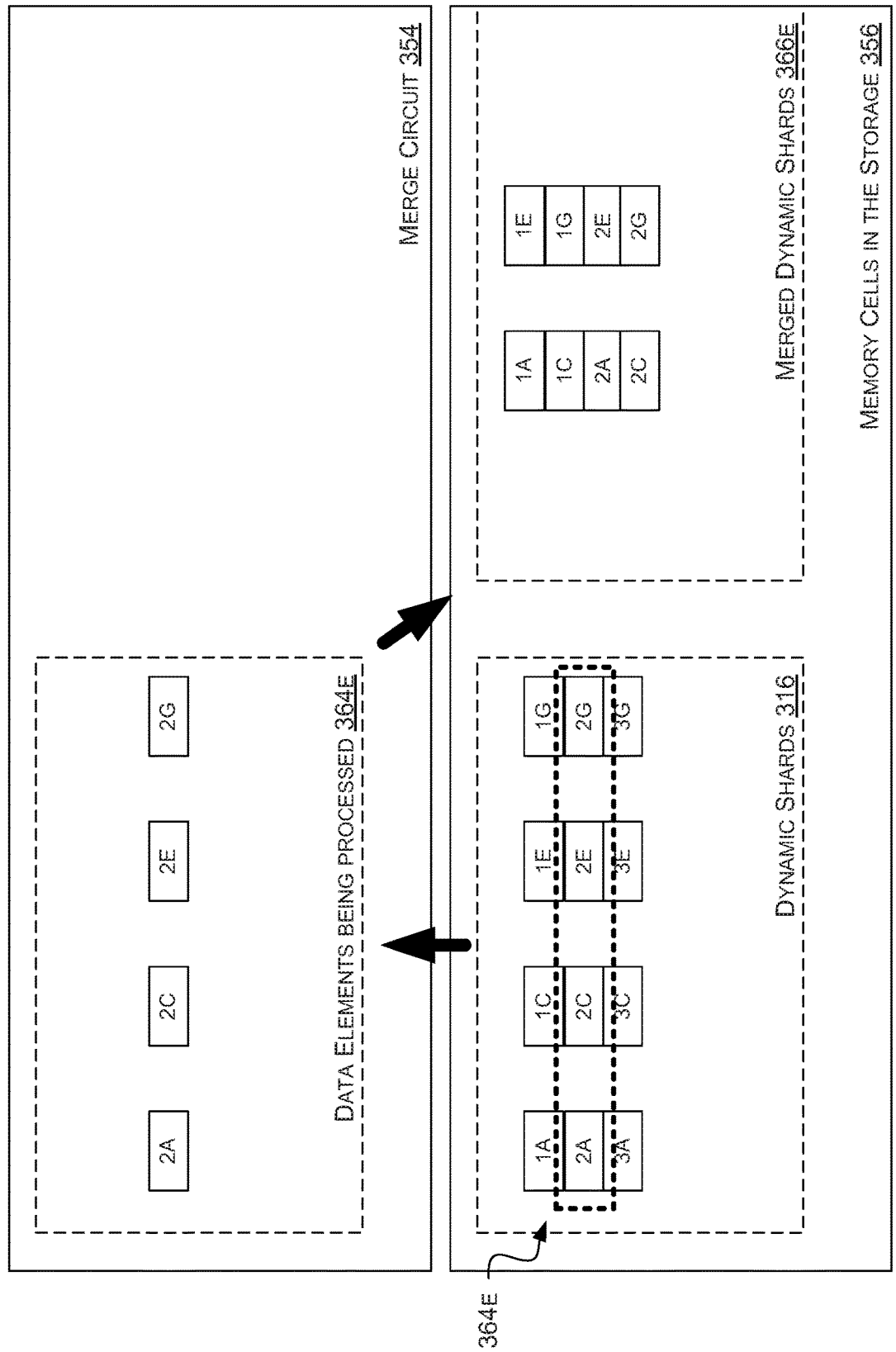

FIGS. 3D, 3E, and 3F are diagrams of an example embodiment of a system 301 in accordance with the disclosed subject matter. In the disclosed subject matter, instead of accepting and using the dynamic shards 316 created above, new dynamic shards may be created that provide for more efficiency. Further, this creation may occur via an offload circuit or engine. In some embodiments, this may include the storage device itself (further reducing IO traffic) and may be performed by the controller processor (as opposed to the host processor).

In the illustrated embodiment, the system or storage device 301 may include a plurality of memory cells 356 in the storage portion, and a merge or processing circuit 354. In various embodiments, the merge circuit 354 may include the controller processor of the storage device 301. In another embodiment, the merge operation and merge circuit 354 may be included in the host processor. However, a localized (as opposed to external) merge circuit 354 may reduce IO overhead and further increase efficiency, as described below.

In the illustrated embodiment of FIG. 3D, a number of dynamic shards 317 (e.g., created via techniques described above) may be stored in the memory cells 356. Those shards 317 may then be loaded into the merge circuit 354. In another embodiment, the merge circuit 354 may perform its work with the data in place in the storage 356.

In such an embodiment, the merge circuit 354 may load a subset of elements 365A (1A, 1C, 1E, and 1G) into the buffers of the merge circuit 354 (as elements 364D). The merge circuit 354 may then re-group the elements 364D according to a desired shard size and number of elements. In the illustrated embodiment, the merge circuit 354 may reform four smaller dynamic shards 317 into two larger merged dynamic shards 366. It is understood that the above is merely one illustrative example to which the disclosed subject matter is not limited.

In the illustrated embodiment, the elements 1A and 1C may the written back to the memory cells 356 into a first merged dynamic shard. While elements 1E and 1G may be written back to the memory cells 356 into a second merged dynamic shard. These shards may be included in the merged dynamic shards 366.

Continuing in FIG. 3E, the merge circuit 354 may load a subset of elements 365A (2A, 2C, 2E, and 2G) into the buffers of the merge circuit 354 (as elements 364E). The merge circuit 354 may then re-group the elements 364E according to a desired shard size and number of elements.

In the illustrated embodiment, the elements 2A and 2C may the written back or appended to the memory cells 356 into a first merged dynamic shard. While elements 2E and 2G may be written back or appended to the memory cells 356 into a second merged dynamic shard. These shards may be included in the merged dynamic shards 366.

Continuing in FIG. 3F, the merge circuit 354 may load a subset of elements 365A (3A, 3C, 3E, and 3G) into the buffers of the merge circuit 354 (as elements 364F). The merge circuit 354 may then re-group the elements 364F according to a desired shard size and number of elements.

In the illustrated embodiment, the elements 3A and 3C may the written back or appended to the memory cells 356 into a first merged dynamic shard. While elements 3E and 3G may be written back or appended to the memory cells 356 into a second merged dynamic shard. These shards may be included in the merged dynamic shards 366.

In various embodiments, the merging operation may involve repeated read and write operations at every interval (or multiple intervals). In such an embodiment, the merge circuit 354 may perform reads on multiple dynamic shards 316 to get recent updated values. In such an embodiment, the merge circuit 354 may then perform write operations to the newly merged shards 366. In one embodiment, after the merging process is complete, merge circuit 354 may release or no longer prevent writing to the dynamic shards 316, since all active edges or elements are merged into the merged shards 366.

In such an embodiment, the memory access pattern for the merging operation (and by the merge circuit 354) may be a pattern of sequential and/or streaming accesses. This may be because the input shards 316 are already sorted by the source vertex index or ID, and the merge circuit 354 then sorts the output based on the source vertex index or ID of the edge. In such an embodiment, the memory access pattern for the dynamic shards 316 may include sequential reads, and the memory access pattern for merged shards 366 may include sequential writes.

In various embodiments, merging operation may be performed within a storage device, and may not (or minimally) affect the larger system (e.g., consume bandwidth to the RAM, consume CPU cycles, etc.). As described above, the merge circuit 354 may be included in the controller processor of the storage device. In various embodiments, this may include the controller processor that also performs general storage maintenance (e.g., wear-leveling, write merging, etc.). However, in another embodiment, the merge circuit 356 may include a specialized processor, such as an embedded processor, a parallel-computing processor, or a reprogrammable processor (e.g., a field-programmable gate array (FPGA), etc.). Further, in various embodiments, implementing the merge operation within the storage device may reduce the amount of RAM required, since the operation requires only one edge entry from each dynamic shard may be placed in a buffer for comparison.

As described above, the typical creation of the dynamic shards 316 and the processing of the shards for graph computing purposes typically involves three stages: read, process, and write. The raw data is read from the storage device (read stage). Then processed, which in this case includes creating the dynamic shards 316 (process stage). And, then finally written back to the storage (write stage).

In the illustrated embodiment, the creation and processing of the merged dynamic shards 366 may at a time in the above process when the storage device is not in use or when it has excess resource capabilities (e.g., bandwidth, read/write ports on the memory cells 356, etc.). In such an embodiment, the merge circuit 354 may wait to create the merged shards 366 until the host processor has entered the process stage. During the read and write stages the storage device may be in use, but during the process stage it may generally be idle. In such an embodiment, the disclosed subject matter may make use of unused IO bandwidth and computing power during the overall processing of the graph structure.

Returning to FIG. 3A, as seen the creation of the dynamic shards is based upon the detection of active edges (e.g., active elements 315A, 315B, and 315C). In various embodiments, the detection and/or prediction of active edges may make the processing of the graph data more efficient. In various embodiments, the processor (host or controller) may make use of multiple active edge (or element) detection or prediction polices. In such an embodiment, the processor may be configured to dynamically switch between these multiple polices or dynamically adapt the values or thresholds of these polices based upon the graph application or settings employed. It is understood that the above are merely a few illustrative examples to which the disclosed subject matter is not limited.

In such an embodiment, the processor (host or controller) may be configured to profile the activity of vertices and edges, and also profile a miss rate of active edge prediction using different prediction policies. As such, a failing policy may be replaced with a more accurate one. In such an embodiment, different parameters may be profiled against different prediction policies, since each prediction policy utilizes different parameters for prediction. In various embodiments, multiple prediction polices may be orthogonal, and may be combined for better prediction.

A first prediction policy may include altering the prediction frequency or historical depth used for the prediction. Deciding about active edges based on only one previous iteration may be an efficient optimization for the iteration right after that. But it may not be the most efficient scenario for all the following iterations. In such an embodiment, it may be beneficial to not update active edges in every iteration. In various embodiments, a previously active edge may become active again after a short time of being idle. Therefore, keeping previously active or dormant edges in a dynamic shard (and using a larger sub-graph) may have lower miss prediction thus lower performance overhead than removing the immediately inactive edges from the sub-graph. In such an embodiment, the level (number of interactions) of inactivity before an edge is considered inactive may be dynamically adjusts prediction frequency by profile miss rates. In various embodiments, this may involve the use of a threshold value.

Returning to FIG. 2B, edge updates generally are of two sorts: observed or unobserved. An observed update is one that is known during the current iteration of graph processing. Whereas, an unobserved update is one that is not known about until the next iteration of graph processing. An observed update is one in which the target vertex ID is greater than the source vertex ID (e.g., data elements 270, 272, 274, and 278). This is generally because data elements are processed in the order of their source vertex ID. An unobserved update is one in which the target vertex ID is less than the source vertex ID (e.g., data elements 276 and 280).

In various embodiments, the active edge determination/prediction mechanism may differ on how observed updates are handled compared to unobserved updates. In one such embodiment, all unobserved edges may be considered as active, regardless of any change in their state or values. In such an embodiment, only observed updates may be tested to see if they actually are changed, and therefore active. In such an embodiment, eliminating unchanged observed updates may be more IO efficient for the next iteration. Further, an update to an edge also be an indicator that the vertex and the edge is "hot" and may involve more updates in the future.

In various embodiments, one policy of determining/predicting an active data element may include vertex-based prediction and analysis. In one such embodiment, when an update to one of the incoming edges of a given vertex occurs, the processor may mark all edges related to that vertex as active. In some embodiments, the processor may be set to only may incoming out outgoing edges as active. In various embodiments, vertex-based prediction can lead to large dynamic shard size, but may also have lower miss prediction rate and thus lower performance overhead than edge-based prediction.

In yet another embodiment, another policy for determining/predicting an active data element may include a value-based prediction model. In one embodiment, variable threshold values may be employed for active edge prediction. In such an embodiment, instead of marking any changed edges as active, it may be required that the edge change by a meaningful (as defined by the threshold) amount before being considered active. In such an embodiment, the edge (or vertex if used in conjunction with the vertex-based policy above) may be allowed a certain amount of variance before being considered active. In one such embodiment, if the amount of variation is lower than threshold, the processor may exclude the edge from active edges, and therefore by reducing the amount of edges processed improve the overall system performance. It is understood that the above are merely a few illustrative examples to which the disclosed subject matter is not limited.

Figure 4A:
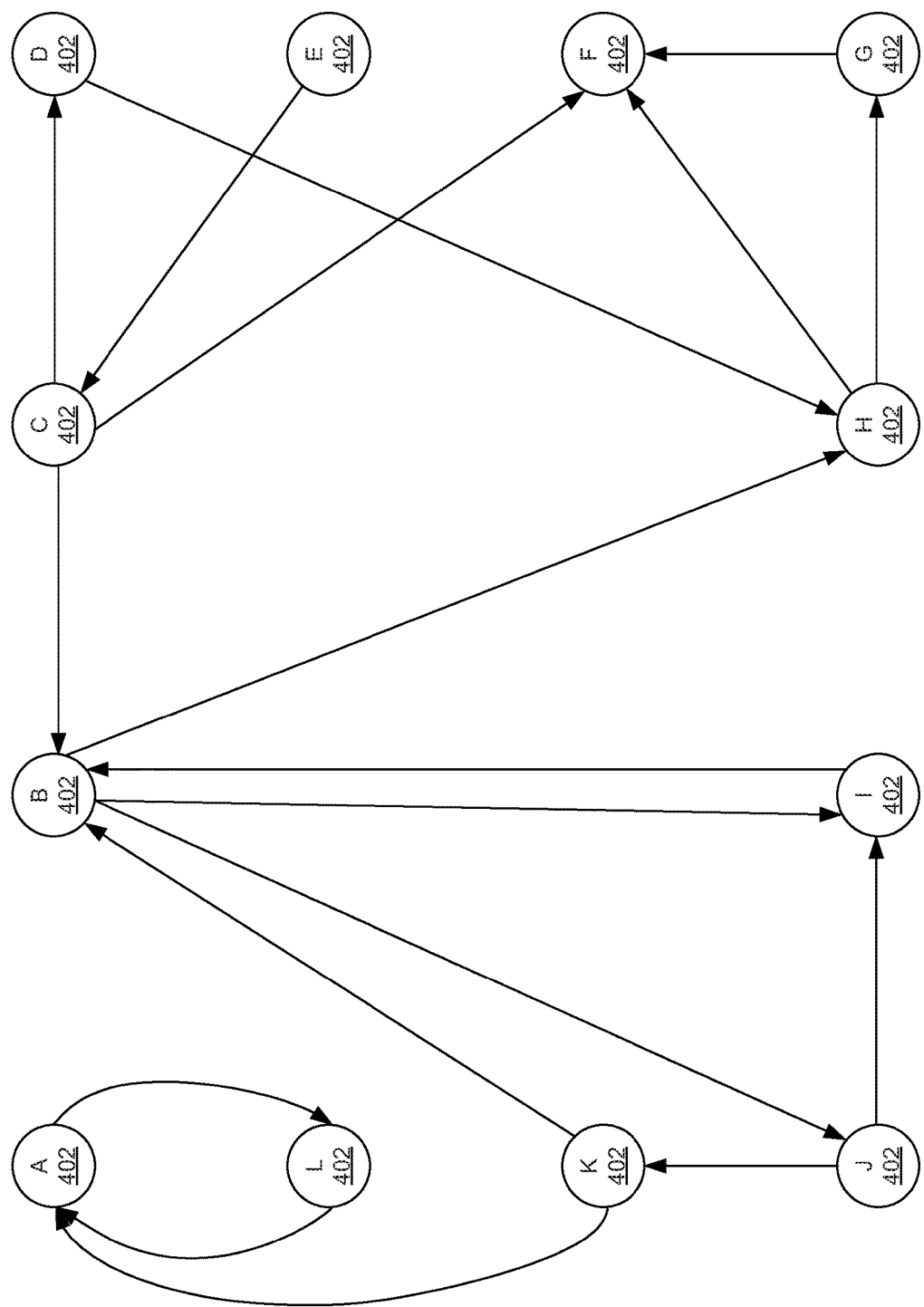
FIGS. 4A and 4B are diagrams of an example embodiment of data structures in accordance with the disclosed subject matter.
Figure 4B:
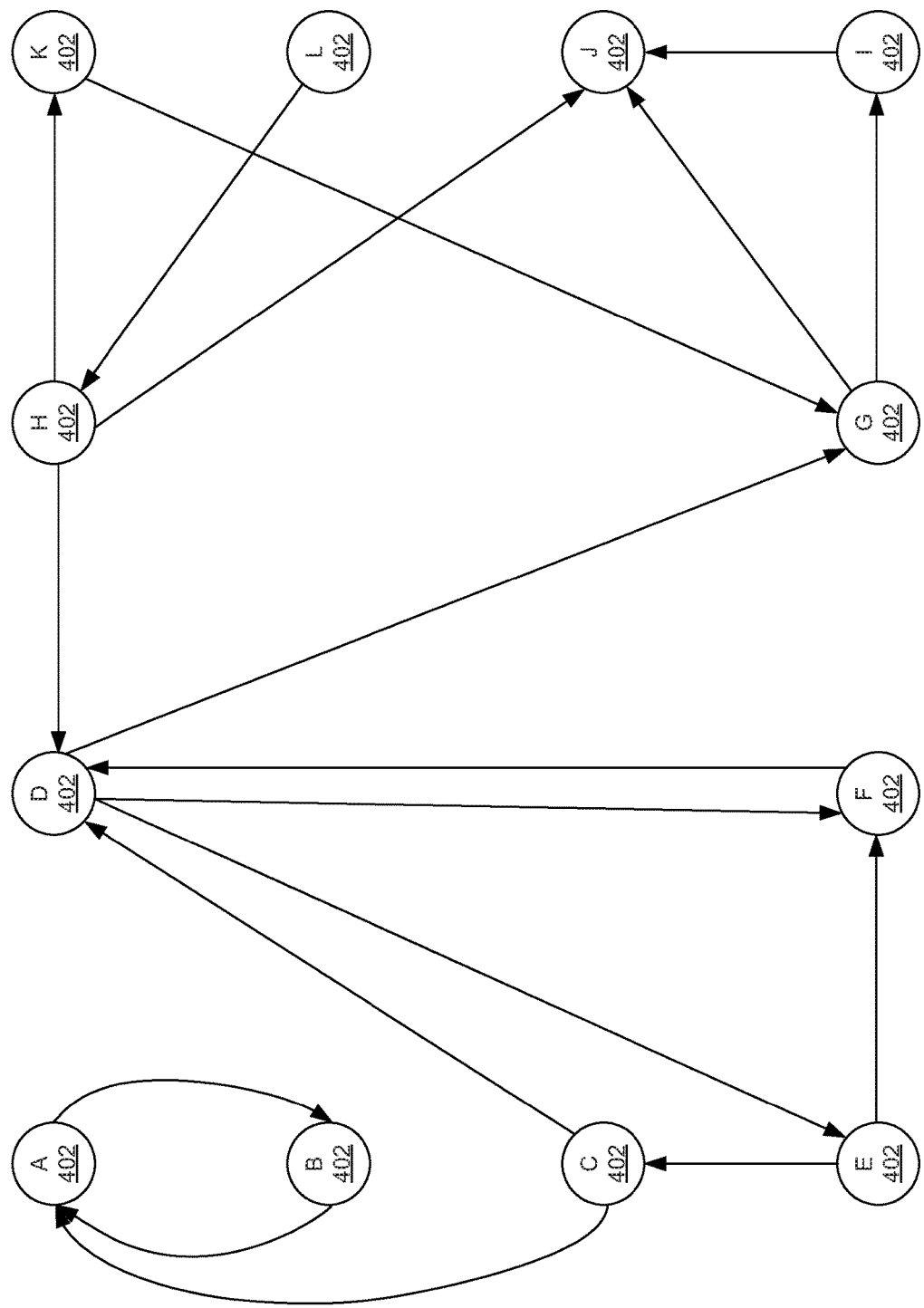

FIGS. 4A and 4B are diagrams of an example embodiment of data structures 400 and 401 in accordance with the disclosed subject matter. In various embodiments, the data structures 400 and 401 may be stored, at least in part, in a storage medium or device, as described above. In various embodiments, the actions described below may be performed by the controller processor (or other processor, e.g., the host processor). In such an embodiment, the controller processor may perform the actions without the help or use of the host processor, and during time periods in which the storage device may otherwise be idle or have excess resources. It is understood that the above are merely a few illustrative examples to which the disclosed subject matter is not limited.

In the illustrated embodiment, the data structure 400 may include a number of vertexes 402, labeled by the index or identifiers (IDs) A-L. As shown in FIG. 4A, these indexes may be somewhat disorganized. For example, the vertex A is connected to vertex L via tow edges, but never connected to vertex B. Vertex K is connected to vertexes A, B. and J. In such an embodiment, the vertex IDs may have been assigned as the vertexes were added to the data structure 400 or given their assignment for other reasons. Again, in many graph applications the data structure may include billions of vertexes. In some embodiments, the data structure 400 may represent a sub-graph of a larger graph, wherein the sub-graph is stored within a single stage device.

In various embodiments, the processor (e.g., the controller processor) may be configured to reassign vertex IDs. In such an embodiment, the processor may be configured to reassign the vertex ID of a destination vertex to an ID that is closer (numerically or, in the illustrated embodiment, alphabetically) to the source vertex ID.

In various embodiments, this may be done by traversing the graph structure 400. For example, the processor may walk through the graph structure 400, determining sources and destinations and then reassigning vertex IDs as needed or as possible. In some embodiments, the processor may perform the traversal using techniques such as Breath First Search (BFS) or Depth First Search (DFS); although, it is understood that the above are merely a few illustrative examples to which the disclosed subject matter is not limited.

In one such embodiment, the reassignment technique may result in the graph structure 401 of FIG. 4B. Again, the vertexes 402 have IDs from A-L, but those ID assignments may be much less random or more sequential. For example, by re-assigning vertex L to B, vertexes A and B are now next to each other and share edges. It is understood that this re-assignment did not change the meaning of the vertex L/B or its value, the re-assignment only changed the index or identifier associated with it. Likewise, the vertex originally labeled or identified as B in graph 400 did not "move" in graph 401; it just got renamed or re-assigned to the label D.

However, as can be seen in structure 206 of FIG. 2B, data elements tend to be sorted or stored based upon their vertex IDs. Therefore, by re-assigning vertex IDs such that source and destinations are closer to one another, their associated data elements then to be stored closer to one another. This may result is more efficient data accesses as the data accesses may more often be sequential, as opposed to random or non-sequential. Thus reducing the number of disk accesses. The re-assignment of the vertex IDs may result in a sorting or more efficient storage of the graph's actual data structure.

In various embodiments, this re-assignment may only be performed upon active vertexes. In various embodiments, the number of active vertexes is usually much smaller than the number of vertexes within an entire graph or sub-graph. In such an embodiment, re-assigning IDs to fewer vertexes may increase the possibility of assigning IDs that are closer to their source vertexes. As described above, in some embodiments, various edge prediction techniques may be employed to define what an active vertex is.

In some embodiments, the re-assignment technique may result in faster active vertex/edge determination or prediction. In such an embodiment, as active vertexes are assigned lower IDs, they are processed at the beginning (or closer to the beginning) of each iteration of the graph processing (which tends to process the data elements in order by ID). Generally, to identify whether a vertex or edge is active, the processor needs to wait until all incoming edges of the vertex are processed. Again, by re-assigning or sorting the data elements such that associated data elements are grouped together, that wait time may be reduced.

In various embodiments, vertex reassignment may be used with concurrent merging of dynamic shards. As described above, the merging operation may include repeated read and write operations during each interval. In such an embodiment, by re-assigning IDs such that updates are localized into single shards the number of shard accesses needed to merge dynamic shards may be reduced. This in turn may provide a shorter time to collect all updates associated with the new shard.

Figure 5:
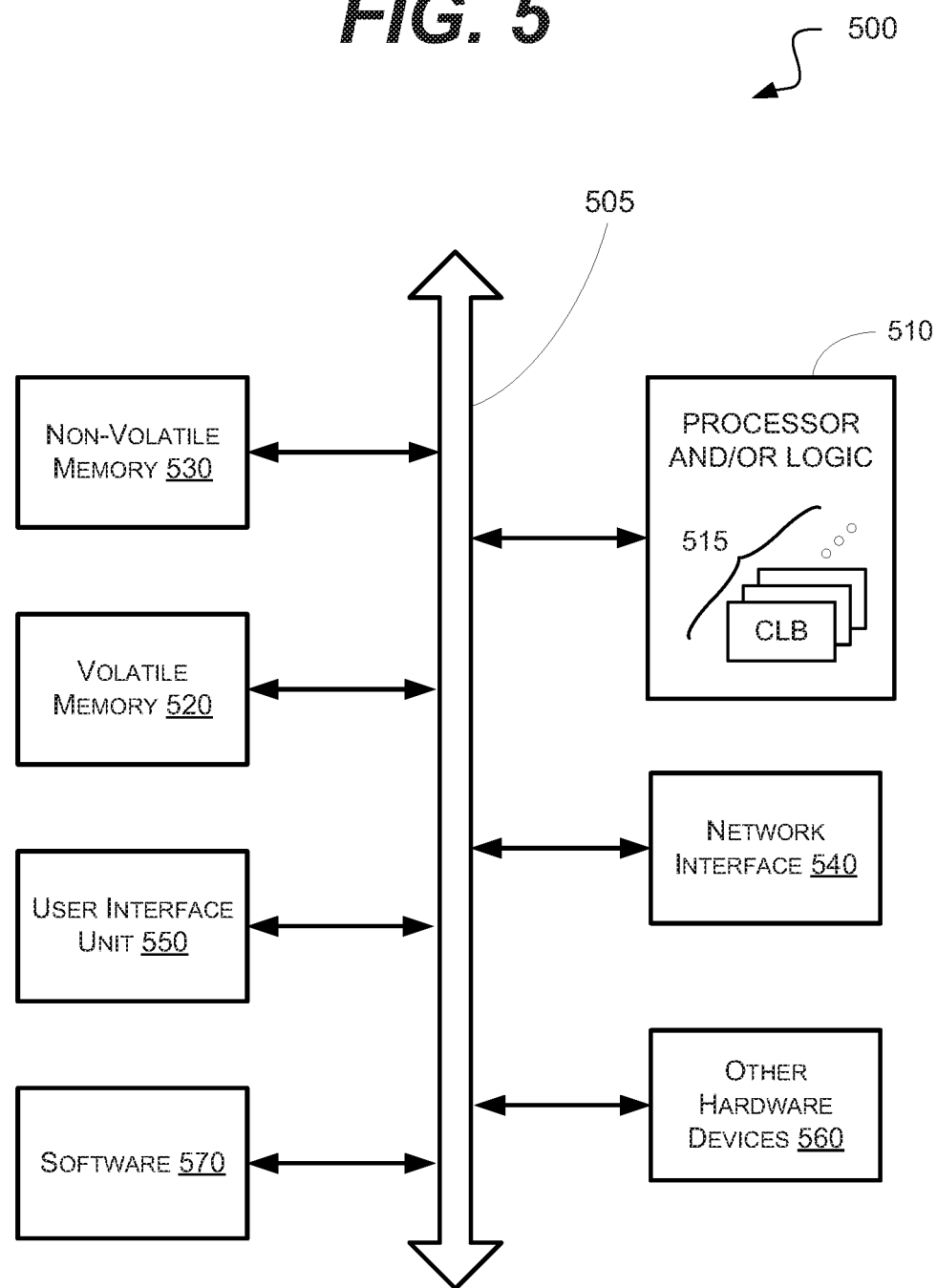
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
    a storage drive comprising:
        a host processor interface circuit configured to communicate data and commands with an external host processor circuit;
        a controller processor circuit configured to:
            send shards including graph data elements, from the storage drive, to the host processor circuit using the host processor interface circuit to determine, based on processing at the host processor circuit:
                a first active graph data element is active based on a variation of the first active graph data element satisfying an active element threshold and the first active graph data element having a first state and a second state that is different from the first state; and
                a second active graph data element is active based on a variation of the second active graph data element satisfying the active element threshold and the second active graph data element having a third state and a fourth state that is different than the third state,
            receive, at the storage drive, using the host processor interface circuit, the first active graph data element and the second active graph data element from the host processor circuit,
            include, based on processing at the controller processor circuit, the first active graph data element in a first dynamic shard and the second active graph data element in a second dynamic shard, and
            merge, based on processing at the controller processor circuit offloaded from the host processor circuit, at least a portion of the first dynamic shard and at least a portion of the second dynamic shard into a merged dynamic shard, wherein the controller processor circuit performs the merge based on a determination that the host processor circuit has entered a process stage; and
        a non-volatile memory configured to store data in an at least a partial graph structure, wherein the graph structure includes data elements that include vertexes and an edge, and wherein sub-portions of the data elements are grouped into shards;
    wherein the merged dynamic shard comprises the first one of the active graph data elements and the second one of the active graph data elements.

2. The apparatus of claim 1, wherein the controller processor is configured to perform the merge, based, at least in part, upon a status of the host processor interface circuit.

3. The apparatus of claim 1, wherein the host processor interface circuit is configured to:
    provide a shard to the external host processor circuit for processing, wherein the processing includes updating zero or more data elements within the shard; and
    write the updated data elements to the non-volatile memory as a portion of a dynamic shard.

4. The apparatus of claim 3, wherein the controller processor circuit is configured to:
    collect the size of a dynamic shard written via the host processor circuit;
    determine a number of neighboring dynamic shards or partial shards to merge into a merged dynamic shard; and
    sort one or more active edges by a source identifier to maintain the ordering properties of the shards.

5. The apparatus of claim 1, wherein the controller processor circuit comprises a buffer memory; and
    wherein, for a shard merged into a merged dynamic shard, the controller processor circuit is configured to:
        copy a data element from the shard from the non-volatile memory to the buffer memory,
        group the data elements into one or more merged dynamic shards, and
        write the data elements to the non-volatile memory as part of the one or more merged dynamic shards.

6. The apparatus of claim 1, wherein an active edge is determined by an active edge prediction policy.

7. The apparatus of claim 6, wherein the active element threshold includes a dynamically adjusting threshold value.

8. The apparatus of claim 6, wherein the active edges include unobserved, within a processing iteration, updated active edges.

9. The apparatus of claim 6, wherein the active edge prediction policy is dynamically adjusted based, at least in part, upon a miss rate of observed updated active edges.

10. The apparatus of claim 6, wherein the active edge is determined by:
   determining a vertex associated with the edge has changed, based on one or more edges associated with the vertex as active edges.

11. The apparatus of claim 1, wherein a vertex is associated with a vertex index number; and
   wherein the controller processor circuit is configured to:
      reassign a destination vertex's index number from a first index number to a second index number such that the destination vertex's second index number is numerically closer to a source vertex's index number than the destination vertex's first index number, wherein the source vertex is associated with the destination vertex.

12. The apparatus of claim 11, wherein the controller processor circuit is configured to:
   divide the at least partial graph structure into one or more sub-graph structures; and
   use a traversal technique from a first vertex to identify source vertex and destination vertex associations; and
   reassign respective vertex index numbers based, at least in part, upon the source vertex and destination vertex associations.

13. The apparatus of claim 11, wherein the controller processor circuit is configured to:
   reassign a destination vertex's index number based on the destination vertex being an active vertex.

14. The apparatus of claim 11, wherein the controller processor circuit is configured to:
   create one or more new shards that include data elements whose vertexes index numbers have been reassigned.

15. The apparatus of claim 1, wherein the controller processor circuit is configured to:
   utilize reassignment of vertex identification numbers to localize active updated data elements within one or more shards.

16. A system comprising:
   at least one storage device; and
   a host processor circuit configured to execute instructions related to a graph data structure, receive, from the at least one storage device, shards including graph data elements, perform a determination, based on processing by the host processor circuit, that:
      a first active graph data element is active based on a variation of the first active graph data element satisfying an active element threshold and the first active graph data element having a first state and a second state that is different from the first state; and
      a second active graph data element is active based on a second active graph data element satisfying the active element threshold and the second active graph data element having a third state and a fourth state that is different than the third state, the host processor circuit sending the first active graph element and the second active graph element to the at least one storage device based on the determination;
   wherein the at least one storage device comprises:
      a host processor interface circuit configured to communicate data with the host processor circuit;
      a controller processor circuit configured to:
         send the shards including graph data elements to the host processor circuit,
         receive the first active graph data element and the second active graph data element from the host processor circuit,
         include, based on processing by the controller processor circuit the first active graph data element in a first dynamic shard and the second active graph data element in a second dynamic shard, and
         merge, based on processing by the controller processor circuit offloaded from the host processor circuit, the at least a portion of the first dynamic shard and at least a portion of the second dynamic shard into a merged dynamic shard,
      wherein the controller processor circuit performs the merge based on a determination that the host processor circuit has entered a process stage; and
      a non-volatile memory configured to store data in an at least partial graph structure, wherein the graph structure includes data elements that include vertexes and an edge, and wherein sub-portions of the data elements are grouped into shards;
   wherein the merged dynamic shard comprises the first one of the active graph data elements and the second one of the active graph data elements.

17. The system of claim 16, wherein the controller processor circuit is configured to perform the merge based, at least in part, upon determining the apparatus is not engaged in a command received by the host processor interface circuit.

18. The system of claim 16, wherein the host processor circuit is configured to determine one or more edges are active edges based on an active edge prediction policy.

19. The system of claim 16, wherein a vertex is associated with a vertex index number; and
   wherein the host processor circuit is configured to:
      reassign a destination vertex's index number from a first index number to a second index number such that the destination vertex's second index number is numerically closer to a source vertex's index number than the destination vertex's first index number, wherein the source vertex is associated with the destination vertex.

* * * * *